April 21, 1970 J. H. FORKNER 3,507,310
METHOD FOR DESTEMMING FIGS
Filed Oct. 21, 1968 2 Sheets-Sheet 1

INVENTOR.
JOHN H. FORKNER
BY
ATTORNEYS

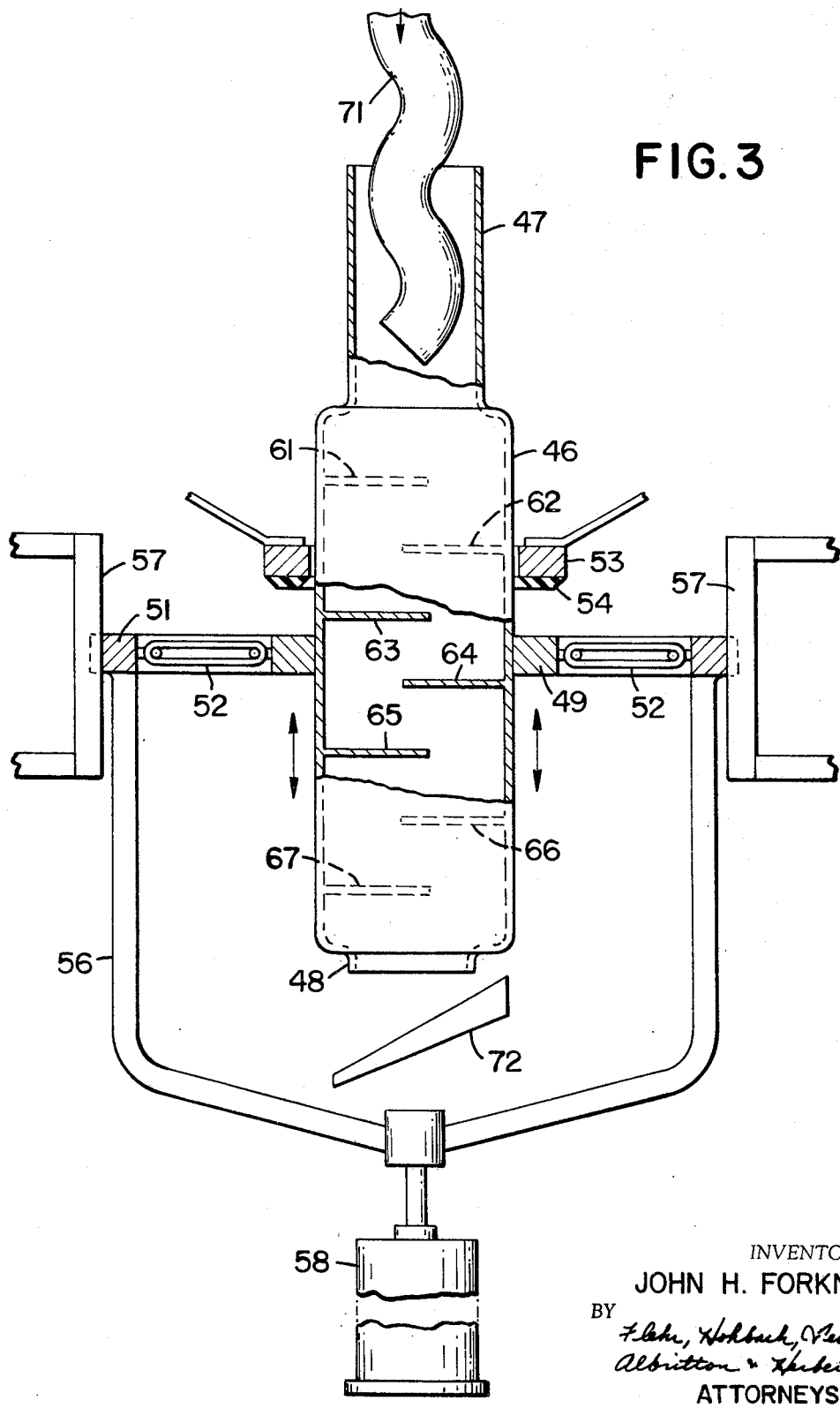

United States Patent Office 3,507,310
Patented Apr. 21, 1970

3,507,310
METHOD FOR DESTEMMING FIGS
John H. Forkner, 6037 N. Van Ness Blvd.,
Fresno, Calif. 93705
Continuation-in-part of application Ser. No. 561,802,
June 30, 1966. This application Oct. 21, 1968, Ser.
No. 769,195
Int. Cl. A23n 15/02
U.S. Cl. 146—226                    5 Claims

ABSTRACT OF THE DISCLOSURE

A fig destemming method in which dried figs are chilled by contact with refrigerated air to make the stems brittle and then subjected to repeated and randomly applied impacts with the figs being impelled from one impact to the next. The impacts serve to break away both extended and nested stems. The apparatus serves to apply the desired repeated impacts to the chilled figs.

CROSS-REFERENCE TO RELATED APPLICATION

This application is a continuation-in-part of my copending application Ser. No. 561,802, now abandoned, filed June 30, 1966, for "Method and Apparatus for Destemming Figs."

BACKGROUND OF THE INVENTION

In the fig industry it is customary to dry figs after they naturally fall from the tree. Generally they are dried on trays exposed to the sun or in mechanical dehydrators to a moisture content in the range from 12 to 18%, about 16% being optimum. Thereafter the figs may be stored for several months in sacks, boxes or bins. During drying and storage the individual figs are pressed against each other and against confining walls of the trays and containers, whereby many of the stems are compressed into the body of the figs or pushed back into the fig in a nested manner. Further processing comprises upgrading the quality standards and rehydration to from 24 to 29%, with preservatives being added for the higher moisture content ranges. It is customary for the packager at this time to divide the pack into two main groups, the first being generally the larger and selective varieties for packaging to be eaten out of hand, and the second (which is the major percentage in the United States) being used for the manufacture of fig paste such as is incorporated in fig bars. In both instances it is customary to leave the stems intact. Thus in the first group the figs are packaged with the stems. In the second group the stems are ground together with the fig bodies. Although it is possible to satisfactorily grind the stems to such fineness that the presence of stem-derived solids in the paste is not apparent, occasionally some incompletely ground stem fragments or fibers (known as "nits") find their way into the final product, with the result that edibility is impaired. In fact the presence of such fragments derived from the stems may cause serious legal liability to the consumer trade. Thus it would be desirable to remove the stems of figs before grinding. In the Mediterranean areas, where labor cost is low, it has been attempted in rare instances to remove the stems by hand. However, this has proven to be unsatisfactory, even with low labor costs, and is entirely impractical in the United States or other areas where labor costs are relatively high.

Dried figs have properties which distinguish them from other fresh or dehydrated fruits. The bodies of the figs have a relatively high sugar content. The stems likewise have a substantial sugar content and are relatively strong and tenacious. Also the bodies tend to have inner core spaces so that when sprayed with or immersed in water, more or less water tends to penetrate into such spaces.

SUMMARY OF THE INVENTION AND OBJECTS

In general, it is an object of the present invention to provide an inexpensive mechanical method for the effective removal of stems from dried figs.

Another object is to provide a method of the above character which does not injure the skin or flesh of the fig and does not require human contact.

Another object is to provide a fig destemming method which effectively removes stems that are pressed back upon or nested within the fig body.

Another object is to provide a method which can be controlled to provide varying results. By way of example, the method can be controlled to effect removal of the stems only, or if desired, portions of the shanks, together with the stems.

Additional objects and features of the invention will appear from the following description in which the preferred embodiments have been set forth in detail in conjunction with the accompanying drawing.

BRIEF DESCRIPTION OF THE DRAWING

FIGURE 3 is an elevation in section schematically illustrating apparatus for imparting impact forces to the brittle stems of the figs.

DESCRIPTION OF THE PREFERRED EMBODIMENT

The present invention is based upon my discovery that when the stems of dried figs are chilled to temperature levels below about 20° F., they are made friable or brittle, and readily break off when bent or when impact forces of relatively low magnitude are applied. Thereafter, the figs, without the stems, can be processed in the usual manner.

Figure 1:
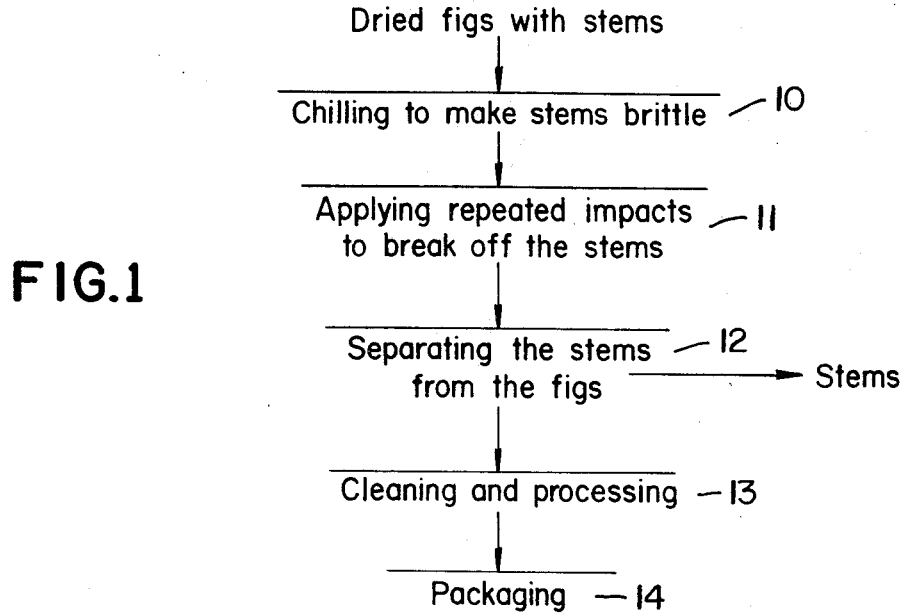
FIGURE 1 is a flow sheet illustrating steps for carrying out my method.

The flow sheet of FIGURE 1 illustrates the steps referred to above. Figs which have been dried to a moisture content of the order of from 12 to 18% and stored prior to processing, are shown being chilled in step 10 to the extent sufficient to make the stems brittle. In step 11, repeated impact forces are applied to break off the friable or brittle stems. In step 12, the broken off stems are separated from the bodies of the figs. The preceeding steps are carried out without cleaning the figs and without immersion of the figs in water. Thereafter the figs are subjected to conventional processing in step 13 which may involve washing in water and pressure steaming. The moisture content after such processing may be of the order of from 24 to 29%. The higher moisture contents generally require the presence of a preservative. Thereafter, the processed figs may be packaged in step 14 for marketing.

Figure 4:
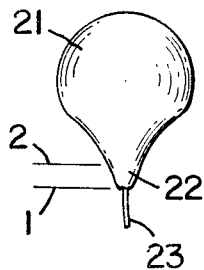
FIGURES 4, 5 and 6 illustrate three different types of dried figs.
Figure 5:
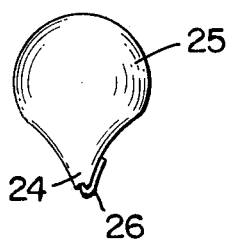
Figure 6:
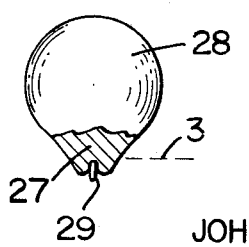

The physical characteristics of figs vary with different varieties. In the United States (California) the principal varieties are Calimyrna, Kadota, Black Mission, and Adriatic. These and other varieties are grown in such Mediterranean countries as Turkey, Greece, Italy, Spain and Portugal. Some typical stem forms and shapes for dried figs grown in the United States are shown in FIGURES 4, 5 and 6. Taking representative batches of Kadotas, Calimyrnas, and many second-crop Black Missions, many of the individual figs will appear as in FIGURE 4. The body 21 of such figs has an extended shank 22 to which the stem 23 is attached. The stem may protrude relatively straight or be somewhat curved. Others of the same batches will appear as shown in FIGURE 5. Here the neck or shank 24 is shorter and thicker, with the stem 26 J-shaped or bent back and indented or nested against the shank.

FIGURE 6 is representative of another type fig. Here the neck 27 of the body 28 is somewhat shorter and thicker, and the stem 29 is deep-seated within the shank. In other words, the stem may be said to be pressed back, or nested into or "cupped" within the shank.

The fig types shown in FIGURES 5 and 6 result from the conventional handling practices previously described. Thus stems may be pressed and permanently set to the forms shown in FIGURES 5 and 6 by dried figs pressing against each other or against the walls of trays or containers during sun drying, dehydration and storage.

My method can be controlled whereby it may be effectively applied to all of the types shown in FIGURES 4, 5 and 6. Thus it will destem figs with a high degree of efficiency, although in a typical batch being processed a substantial number will have stems comparable to FIGURES 5 and 6, which are difficult to remove. Also in addition to removing stems, the method can be applied to remove portions of the shanks with the stems.

The chilling step 10 can be carried out by contacting the figs with refrigerated air as by placing them in a refrigerated space for a sufficient period of time to cause the stems to become brittle. In general, the stems of all varieties and types tend to become brittle at a temperature level below 32° F. (e.g., 30° F. or lower). In instances where the stems are bent back in the manner shown in FIGURE 5, temperatures of the order of 20° F. or lower are desirable. Figs of the type shown in FIGURE 6 have stems that are more difficult to remove, and here it is desirable for the stem and its point of attachment to the shank to be at a temperature level below 20° F. and preferably below 0° F. With reference to the temperature levels mentioned above, I have found that the levels at which the stem becomes brittle vary somewhat with moisture control. A higher moisture content tends to require a lower temperature level to attain a brittle state. Thus the temperature level may vary as much as 30° F. for differences in fig moisture content ranging between 12 and 18%. (Stems may have a lower moisture content, often in the order of one-half that of the fig body.) Chilling by immersion in liquid is avoided, because such liquid would tend to penetrate into core spaces of the body.

Assuming that the figs are contacted with refrigerated air by placing them in a refrigerated space for a sufficient period of time to cause the entire fig to assume a desired low temperature level, as for example, 20° F., the stems become brittle and are usually frozen. The bodies of the figs may be hardened at this temperature level but are not frozen. This is due to the fact that the sugar content of the bodies is relatively high, whereas the sugar content of the stems is substantial but considerably less than that of the bodies. Also the higher moisture content of the body tends to retard attainment of the brittle state for a particular temperature level.

Instead of reducing the entire fig to a low temperature level, I may apply rapid chilling in such a selective manner that the stem and its point of attachment first reaches a low temperature level sufficient to make it brittle, while the body of the fig remains pliable and is at a considerably higher temperature level (e.g., above 30° F.). There will be some temperature gradient between the body of the fig and the end of the shank. Likewise there will be some temperature gradient between the outer layer of the fig body and the inner part of the flesh.

Selective chilling as described above can be carried out by subjecting the figs to currents of cold air at a temperature of the order of 20° F. or less. Thus a mass of the dried figs resting upon a screen can be chilled by circulating cold air through the mass for a period of time sufficient to reduce the stems to a desired low temperature level. Another suitable procedure is to continuously progress a loose layer of the dried figs on a perforated conveyer, with means for continuously passing streams of cold air through the mass as it is being conveyed. In this way the fig stems can be quickly reduced to a temperature of the order of 20° F. or less within a period of time of the order of 3 to 30 minutes (5 to 15 minutes is generally practical), while over the same period the bodies of the figs will assume an average temperature of the order of 20 to 60° F. There will be a temperature gradient from the bodies of the figs through the shank to the stem.

The time period of retention of the figs within the stream of cold air or other cold gas can be controlled to produce the desired type of chill. Thus undue chilling of the bodies of the figs can be avoided. Also, by proper control, a part of the shank of the fig can be made brittle with the retention of a pliable body portion so that a part of the shank is removed together with the stems.

Although selective chilling may be desirable in some instances, I find that it is quite practical to chill to the point that the body of the fig is hard. Under such conditions it is certain that the stems are brittle and can be effectively removed as hereinafter described.

Application of forces in step 11 to break off the stems can be applied by various type of simple mechanical equipment. Agitation of the figs as by tumbling will effect removal of figs having stems as shown in FIGURE 4 but is not effective for the figs of FIGURE 5 or 6. I have discovered that the stems of figs as shown in FIGURES 5 and 6 can be effectively removed by applying repeated random impacts. Such impacts can be applied by passing the fig through a hammer mill or by use of the apparatus to be described with reference to FIGURE 3.

Separating the stems from the figs in step 12 can be carried out by conventional separating equipment such as screens, pneumatic jet separators, and the like.

As previously stated, the cleaning and processing step 13 follows removal of the stems and can be carried out in a conventional manner. In a typical instance, this may involve steaming and immersion in sterile hot water to effectively remove all foreign material from the surfaces of the figs. In the United States it is also common to employ pressure cooking with rehydration to produce a final product having a moisture content of the order of 24 to 29%. Such processing may also involve the use of chemical agents, as for example bleaching mediums and preservatives.

Figure 2:
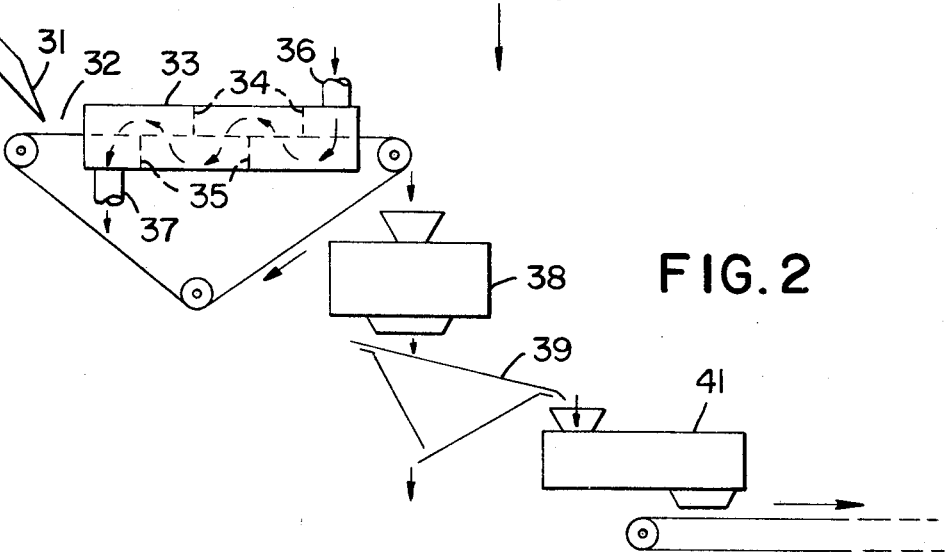
FIGURE 2 schematically illustrates equipment for carrying out the method.

FIGURE 2 schemaitcally illustrates equipment for carrying out the foregoing method. The dried figs are delivered by chute 31 to a perforated endless belt convyor 32. The upper run of the conveyor carries the figs through the chamber 33, which is provided with upper and lower baffles 34 and 35. Cold air or other gas is introduced through conduit 36 and removed through conduit 37. Within the chamber 33 the streams of cold air pass vertically and repeatedly through the layer of figs. After being subjected to the streams of cold air for a predetermined period of time, the chilled figs are deliverd to the device 38 where they are subjected to repeated random impact forces for causing the stem to be broken, including stems from figs such as shown in FIGURES 5 and 6. The figs and stems are delivered from device 38 to the screen 39 where the stems are separated from the figs. The figs are then supplied to the apparatus 41 where they are subjected to conventional processing.

One suitable form of apparatus for applying repeated random impacts to the brittle stems is shown in FIGURE 3. It consists of an upright chamber 46 provided with an inlet conduit 47 and a discharge conduit 48. The inner surfaces of the side walls may be roughened or abrasive and the chamber preferable is square or octagonal in section or the walls otherwise positioned to maximize direct or right angle impacts. The chamber is supported by some form of compliance means whereby it can be oscilated or reciprocated in a vertical direction. For example, the metal ring 49 attached to the chamber 46 is connected to the larger surrounding ring 51 by a plurality of radially extending compliance members 52, which may be tension springs or tensioned bands of resilient material like natural or synthetic rubber. Another ring 53 surrounds the chamber above the ring 49 and is secured to a fixed support. A bumper 54 is mounted upon the lower side of ring 53 and may be made of suitable elastic material such as natural or synthetic rubber. Ring 51 is shown carried by the frame 56 and is guided for vertical reciprocating movement by the stationary tracks 57. The lower end of the frame 56 is shown attached to power means to effect its vertical reciprocation or oscillation, such as the pneumatic piston and cylinder device 58. The interior of the chamber 46 is provided with a series of vertically spaced shelves 61–67. These shelves are overlapping in the manner indicated. Conduit 71 is shown for introducing chilled dried figs into the chamber 46. It may be zigzag as illustrated to control the speed of downward drop. A chute 72 is shown below the chamber for receiving the figs and stems.

The apparatus shown in FIGURE 3 operates as follows. The chilled figs are fed continuously through the conduit 71 into the upper part of the chamber 46. The chamber is continuously oscillated in a vertical direction. At the upper end of its stroke the ring 49 impacts the bumper 54, thus providing an abrupt jar or stop. Within the chamber 46 the figs progress from the upper to the lower end, and during such progression they impact the shelves and are repeatedly tossed upwardly from the shelves and repeatedly impacted with each other and with the shelves and the sides of the chamber. As a result, the brittle stem are subjected to repeated impact forces to effect their removal, while the forces applied to the bodies of the figs are insufficient to cause any injury. Such impact forces are effective to break and remove stems such as shown in FIGURES 5 and 6 as well as extended stems as shown in FIGURE 4.

Examples of my invention are as follows.

EXAMPLE I

Typical samples were taken of various dried figs such as are grown commercially in California. The samples including both fancy and the smaller paste size of Calimyrna figs, the larger and smaller sizes of Mission Blacks, and also the Kadota and Adriatic varieties. These figs varied somewhat in size and other physical characteristics. The Calimyrna fancy figs ran from about 18 to 24 figs per pound, or in other words from 36,000 to 50,000 figs per ton. The commercial fig paste grades ran about 50 to a pound, and ranged from about 60,000 to 100,000 figs per ton. The larger Mission Black figs were about the same size as the Calimyrna fancy figs and ran about 24 to the pound. The smaller commercial or paste sizes of Mission Blacks ran about 60 figs per pound, or about 50,000 to 130,000 figs per ton, and the same was also true of the Adriatic and Kadota figs.

The stems of the larger Calimyrna figs were relatively woody. They were about one-quarter to one-half inch long, averaging about three-eighths of an inch in length. For the larger varieties, these stems were naturally flattened or ribbon like, and in section measured about one-quarter inch wide and about one-eighth inch thick. The stems of the smaller paste size Calimyrna figs measured in section about three-sixteenths of an inch wide and one-eighth inch thick. The larger sizes had a shank measuring about one-half to five-eighths of an inch in length.

The stems of the Mission Black figs averaged about three-sixteenth inch in length and about one-eighth inch in diameter. They were characterized by a relatively long neck, tapering to about three-sixteenth of an inch in diameter near the stem. In general, the stems of the Black Mission figs were relatively softer and more pliable than the stems of other varieties, and they separated more readily from the body of the fig.

The stems of the Kadota figs were considerably more woody than that of the Calimyrna figs. These stems measured from about one-quarter to five-eighths inch in length, averaging about three-eighth inch. In section, the stems were relatively round and measured about one-sixteenth to three-thirty-seconds inch in diameter. The moisture content was considerably less than that of the Calimyrna and Mission Black figs (16%), being about 12%. The shank of the Kadota figs is relatively short and tapers abruptly. Figs of this variety in California are presently more commonly used in the manufacture of fig paste.

The stems of the Adriatic figs were relatively flat or ribbon-like. They averaged about three-eighths of an inch in length, and in section measured about one-eighth inch wide and one-sixteenth of an inch thick. The shank portion near the stem measured about three-eighth of an inch in diameter. They appeared in general similar to the Calimyrna figs but were smaller and more woody.

All of the above samples had been stored for about five months, and their moisture contents ranged from about 12 to 16%.

It was noted that there was considerable variation in the shaping of the stems and in positioning of the stems relative to the body. This is due to distortion of the stems during drying and compaction in storage. A minor percentage of the stems (e.g., 10–15%) had the J form shown in FIGURE 5. Also a small but substantial percentage of the stems (e.g., 5–7%) had nested stems of the type shown in FIGURE 6.

One pound of each of the varieties referred to above was chilled to a low temperature level by contacting the figs with a forced draft of cold air at a temperature of −0° F. in a refrigerated space until the entire fig was frozen solid. The average temperature of the figs was below 20° F. Batches of the frozen figs of each variety, numbering ten in each batch, were then subjected to repeated impact forces to effect removal of the brittle stems. To simulate a machine operation, the figs of a batch were placed in a one gallon container which was square in section and the lid applied. Then the can was shaken manually for about one minute, thereby causing the figs to be violently tossed about within the can, with repeated random impacts with the walls of the can and with each other. Upon inspection, it was found that all of the brittle stems had been broken away from the figs. During the course of applying repeated impacts in the manner described above to each of the several batches, it was noted that the intensity of the impacts required to effectively remove the stems varied with different batches. The stems of the Kadota figs were removed most readily. The Adriatic figs required most intense repeated impacts. Only moderate repeated impacts were required to separate the stems from the Calimyrna figs, and some portions of the shanks were removed together with the stems. The same was noted with the Mission Black figs.

EXAMPLE II

The purpose of this example was to demonstrate other methods for applying repeated impact forces. A small laboratory mill, known as a Moulinex mill, was employed. This type of mill is commonly used to grind coffee, nuts, herbs and the like. While the mill was in operation, frozen figs were individually dropped into the zone of operation of the rotating blades. It was observed that after the frozen fig had been rotated several times, the brittle stems received repeated random impacts sufficient to break them off from the body, including stems as shown in FIGURES 5 and 6. This demonstrated use of various mills, such as hammer mills, to apply the impact forces required to break the stems.

EXAMPLE III

Frozen figs prepared as in Example I were fed to a Fitzpatrick hammermill from which the screen surrounding the rotor had been removed. The rotor was operated at 900 r.p.m. Here again most of the stems were removed, including stems as shown in FIGURES 5 and 6, and in general the results were the same as in Example II.

EXAMPLE IV

Figs representative of different varieties as in Example I were chilled in the same manner as in Example I, but care being taken to limit the chilling effect to the extent necessary to freeze the stems at the junction points between the stem and the shank. Tests indicated that the average temperature of the body of the fig was about 20–30° F., whereas the stem and the shank portion next to the stem were at about −20° F. Under such conditions the body of the figure was firm but somewhat pliable, showing that the moisture content of the body was not frozen. Upon applying repeated impact forces to such figs in the manner described in Example II the stems were effectively broken away from the body.

EXAMPLE V

The purpose of this example was to illustrate the relationship between temperature and the requisite brittleness of the stem to effect its easy removal by repeated impacts. Fig samples of the different varieties as in Example I were placed in a refrigerator and cooled uniformly to a temperature level of about 40° F. Upon examination it was found that the stems were not brittle, and particularly the connections between the stems and the bodies of the figs were not brittle. The stems could be bent back and forth a number of times before breaking away from the body.

The samples referred to above were then further reduced in temperature to the level of 29° F. It was now found that the stems of the Kadotas and Calimyrnas could be readily broken away, or in other words, that the connection of the stems to the bodies of the figs were quite friable or brittle. Stems of the Mission Blacks likewise broke off fairly freely but were not as friable as the Kadotas and Calimyrnas. The stems of the Adriatics likewise possessed noticeable brittleness, but they were more difficult to remove, particularly since the impact forces applied to the stems tended to be absorbed by the pliable fig body. The J formation stems and the nested stems such as shown in FIGURES 5 and 6 likewise exhibited brittleness but were not removed as readily as the simpler relatively straight stems.

EXAMPLE VI

The purpose of this example was to demonstrate the chilling of the dried figs by subjecting them to currents of cold air or other gas. A batch of dried figs was placed on a perforated tray to form a layer about six to eight figs deep. Cold air was circulated through the mass of figs, the air being at a temperature of the order of 0 to 20° F. It was noted that the voids or channels through the mass were such that the air passing through these channels came into effective contact with the stems and adjacent shank portions. Thus there was a selective chilling of the fig with the stems and shank portions being chilled more rapidly to a temperature below 20° F. It was found feasible to control the extent of chilling such that the bodies of the figs were at an average temperature of the order of 30° F., at which temperature they were somewhat pliable, but with the stems and adjacent shank portions being at a temperature below 20° F. whereby the stems were made brittle and susceptible to ready separation from the bodies of the figs by applying impact forces. Some of the samples were subjected to impact forces in the manner described in Examples I and II, with effective removal of the stems.

During the course of cooling the samples in the manner described above, it was found feasible to apply vibration to the tray, thus maintaining the bed of figs in motion to more effectively and uniformly subject the stems and adjacent shank portions to the cold air currents.

In general, the foregoing examples demonstrate the effectiveness of my method. Because the method is effective on figs formed as shown in FIGURES 5 and 6, it makes possible mechanized destemming to a high degree of efficiency (e.g., 90% or better) such as is required for commercial use. The destemming does not cause contamination of the figs and can be carried out before dirt or other refuse is removed. This is because destemming is carried out without contact or immersion of the figs in water or other liquids. Immersion of unclean figs in water or other liquid is undesirable because it tends to carry contaminants into the inner core spaces. The fact that water or other liquids are not applied also facilitates effective separation of the removed stems from the bodies of the figs.

In any commercial operation involving the use of cold air currents passing through masses of the figs, as for example by the use of apparatus such as shown in FIGURE 2, there may be some variations in the temperature level of the stems and other portions of the figs. However, in all such commercial operations good results can be secured by making certain that the stems and adjacent shank portions are at a temperature level not higher than 20° F. and preferably to a lower temperature level within the range of about 10° to −20° F. At such low temperature levels, some of the shank portions may be removed together with the stems, particularly with the varieties providing a readily extended shank or neck. However, this will not cause any appreciable loss of product. When handling a particular variety of fig, the degree of chilling can be readily controlled for most efficient removal of the stems.

The growing and harvesting of figs is seasonal and figs as dried by the grower are delivered in certain seasons to the packer. My method can be applied either before or after storage by the packer. In the foregoing examples the method was applied after storage. A comparison between dried figs before and after storage indicates that the moisture content of the stems before storage by the packer is somewhat lower than after storage, which I attribute to absorption of moisture from the bodies into the shanks and stems during storage. I prefer to apply my method to the dried figs at the time of delivery to the packer, although as stated above, the method may also be applied after storage.

In the foregoing Example I reference is made to the smaller paste sizes of figs. It should be understood that in some instances figs are sliced prior to conversion to paste. In such instances my method can be applied before the figs are sliced.

I claim:

1. In a method of removing stems from dried figs, some of the figs having stems that are extended from the body and others having stems that are pressed against or nested within the body, the steps of contacting the dried figs while at a moisture content of the order of 12–18% with cold air to chill the shanks and stems to a temperature level of about 20° F. or lower to render them brittle, and then subjecting each chilled fig to repeated abrupt and randomly applied mechanical impacts whereby the stems are broken off.

2. A method as in claim 1 in which the figs are chilled by contact with flowing streams of cold gas.

3. A method as in claim 1 in which the impacts are applied to the figs by passing them through an impacting device having moving members which repeatedly impact the figs and propel them to impact against other members and with the impacts being applied in a random manner to cause the stems to be impacted and removed.

4. A method as in claim 1 in which the impacts are applied by passing the chilled figs through a hammer mill of the rotary hammer type, the hammers of the mill repeatedly impacting the figs and propelling the figs to cause them to repeatedly impact each other and the housing of the mill which surrounds the rotor.

5. A method as in claim 1 in which the stems are separated from the figs after their removal and in which after such separation the figs are cleaned.

References Cited

UNITED STATES PATENTS

| | | | |
|---|---|---|---|
| 603,029 | 4/1898 | Pettit | 146—238 X |
| 812,971 | 2/1906 | Adams | 146—228 |
| 939,073 | 11/1909 | Noland | 146—55 |
| 2,508,728 | 5/1950 | Stansbury | 146—228 |

W. GRAYDON ABERCROMBIE, Primary Examiner

U.S. Cl. X.R.

146—55, 228, 238